(12) United States Patent
Perkins et al.

(10) Patent No.: US 10,241,793 B2
(45) Date of Patent: Mar. 26, 2019

(54) PARALLEIZING LOOPS IN THE PRESENCE OF POSSIBLE MEMORY ALIASES

(71) Applicant: ANALOG DEVICES TECHNOLOGY, Hamilton (BM)

(72) Inventors: Michael G. Perkins, Edinburgh (GB); John L. Redford, Arlington, MA (US); Kaushal Sanghai, Somerville, MA (US)

(73) Assignee: ANALOG DEVICES GLOBAL, Hamilton (BM)

( * ) Notice: Subject to any disclaimer, the term of this patent is extended or adjusted under 35 U.S.C. 154(b) by 516 days.

(21) Appl. No.: 14/200,788

(22) Filed: Mar. 7, 2014

(65) Prior Publication Data

US 2014/0281435 A1    Sep. 18, 2014

Related U.S. Application Data

(60) Provisional application No. 61/788,471, filed on Mar. 15, 2013.

(51) Int. Cl.
```
G06F 9/30      (2018.01)
G06F 9/38      (2018.01)
G06F 8/41      (2018.01)
```

(52) U.S. Cl.
CPC ........ *G06F 9/30145* (2013.01); *G06F 8/4452* (2013.01); *G06F 9/3836* (2013.01); *G06F 9/3887* (2013.01)

(58) Field of Classification Search
None
See application file for complete search history.

(56) References Cited

U.S. PATENT DOCUMENTS

| 5,850,551 A | 12/1998 | Takayama et al. |
| 2010/0042789 A1* | 2/2010 | Gonion ............... G06F 8/4441 711/154 |
| 2013/0262833 A1 | 10/2013 | Gonion |
| 2013/0275724 A1 | 10/2013 | Bharadwaj |
| 2013/0283014 A1 | 10/2013 | Wang et al. |

FOREIGN PATENT DOCUMENTS

CN    1138175    12/1996

OTHER PUBLICATIONS

"Automatic Parallelization with Intel® Compilers", Intel Developer Zone [Online], with user comment dated Jul. 29, 2012, 4 pages. Retreived from the Internet on Jan. 22, 2014: <URL:http://software.intel.com/en-us/articles/automatic-parallelization-with-intel-compilers>.

(Continued)

*Primary Examiner* — Corey S Faherty
(74) *Attorney, Agent, or Firm* — Patent Capital Group

(57) ABSTRACT

In one particular example, this disclosure provides an efficient mechanism to determine the degree of parallelization possible for a loop in the presence of possible memory aliases that cannot be resolved at compile-time. Hardware instructions are provided that test memory addresses at run-time and set a mode or register that enables a single instance of a loop to run the maximum number of SIMD (Single Instruction, Multiple Data) lanes to run in parallel that obey the semantics of the original scalar loop. Other hardware features that extend applicability or performance of such instructions are enumerated.

20 Claims, 5 Drawing Sheets

(56) References Cited

OTHER PUBLICATIONS

"Enabling Further Loop Parallelization for Multicore Platforms", Intel® C++ Compiler XE 13.1 User and Reference Guides, Jan. 22, 2014, 4 pages, http://software.intel.com/sites/products/documentation/doclib/iss/2013/compiler/cpp-lin/GUID-47365FA2-56A1-48A3-827E-91757AF66192.htm.
OA1 issued in CN Patent Application Serial No. 201410095115.3 dated Oct. 27, 2016, 7 pages. [includes EN Summary of Relevance].
EP Search Report issued in EP Patent Application Serial No. 14158653.7 dated Oct. 24, 2016, 9 pages.

\* cited by examiner

| CYCLE | INSTRUCTION | P0 | P1 | VECLEN | LC | R0 |
|---|---|---|---|---|---|---|
| 0 | P0 = parameter 1; | 0x1008 | - | 1 | - | - |
| 1 | P1 = parameter 2; | 0x1008 | 0x1000 | 1 | - | - |
| 2 | VECLEN = 8; | 0x1008 | 0x1000 | 8 | - | - |
| 3 | VECLEN = ALIAS(P0, P1, 4/*sizeof(int)*/); | 0x1008 | 0x1000 | 2 | - | - |
| 4 | LOOP (8/VECLEN) | 0x1008 | 0x1000 | 2 | 4 | - |
| 5 | R0 = *P1++; // load in[i] | 0x1008 | 0x1008 | 2 | | PE0: in[0]<br>PE1: in[1] |
| 6 | *P0++ = R0; // store to out[i] | 0x1010 | 0x1008 | 2 | 3 | PE0: ->out[0]<br>PE1: ->out[1] |
| 7 | R0 = *P1++; // load in[i] | 0x1010 | 0x1010 | 2 | | PE0: in[2]<br>PE1: in[3] |
| 8 | *P0++ = R0; // store to out[i] | 0x1018 | 0x1010 | 2 | 2 | PE0: ->out[2]<br>PE1: ->out[3] |
| 9 | R0 = *P1++; // load in[i] | 0x1018 | 0x1018 | 2 | | PE0: in[4]<br>PE1: in[5] |
| 10 | *P0++ = R0; // store to out[i] | 0x1020 | 0x1018 | 2 | 1 | PE0: ->out[4]<br>PE1: ->out[5] |
| 11 | R0 = *P1++; // load in[i] | 0x1020 | 0x1020 | 2 | | PE0: in[6]<br>PE1: in[7] |
| 12 | *P0++ = R0; // store to out[i] | 0x1028 | 0x1020 | 2 | 0 | PE0: ->out[6]<br>PE1: ->out[7] |
| 13 | RETURN; | 0x1028 | 0x1020 | 1 | - | |

FIG. 3

| CYCLE | INSTRUCTION | P0 | P1 | VECLEN | LC | R0 |
|---|---|---|---|---|---|---|
| 0 | P0 = parameter 1; | 0x1010 | - | 1 | - | - |
| 1 | P1 = parameter 2; | 0x1010 | 0x1000 | 1 | - | - |
| 2 | VECLEN = 8; | 0x1010 | 0x1000 | 8 | - | - |
| 3 | VECLEN = ALIAS(P0, P1, 4/*sizeof(int)*/); | 0x1010 | 0x1000 | 4 | - | - |
| 4 | LOOP (8/VECLEN) | 0x1010 | 0x1000 | 4 | 2 | - |
| 5 | R0 = *P1++; // load in[i] | 0x1010 | 0x1010 | 4 | | PE0: in[0]<br>PE1: in[1]<br>PE2: in[2]<br>PE3: in[3] |
| 6 | *P0++ = R0; // store to out[i] | 0x1020 | 0x1010 | 4 | 1 | PE0: ->out[0]<br>PE1: ->out[1]<br>PE2: ->out[2]<br>PE3: ->out[3] |
| 7 | R0 = *P1++; // load in[i] | 0x1020 | 0x1020 | 4 | | PE0: in[4]<br>PE1: in[5]<br>PE2: in[6]<br>PE3: in[7] |
| 8 | *P0++ = R0; // store to out[i] | 0x1030 | 0x1020 | 4 | 0 | PE0: ->out[4]<br>PE1: ->out[5]<br>PE2: ->out[6]<br>PE3: ->out[7] |
| 13 | RETURN; | 0x1030 | 0x1020 | 1 | - | |

FIG. 4

| CYCLE | INSTRUCTION | P0 | P1 | VECLEN | LC | R0 |
|---|---|---|---|---|---|---|
| 0 | P0 = parameter 1; | 0x1000 | - | 1 | - | - |
| 1 | P1 = parameter 2; | 0x1000 | 0x1010 | 1 | - | - |
| 2 | VECLEN = 8; | 0x1000 | 0x1010 | 8 | - | - |
| 3 | VECLEN = ALIAS(P0, P1, 4/*sizeof(int)*/); | 0x1000 | 0x1010 | 8 | - | - |
| 4 | LOOP (8/VECLEN) | 0x1000 | 0x1010 | 8 | 1 | - |
| 5 | R0 = *P1++; // load in[i] | 0x1000 | 0x1030 | 8 | | PE0: in[0]<br>PE1: in[1]<br>PE2: in[2]<br>PE3: in[3]<br>PE4: in[4]<br>PE5: in[5]<br>PE6: in[6]<br>PE7: in[7] |
| 6 | *P0++ = R0; // store to out[i] | 0x1020 | 0x1030 | 8 | 0 | PE0: ->out[0]<br>PE1: ->out[1]<br>PE2: ->out[2]<br>PE3: ->out[3]<br>PE4: ->out[4]<br>PE5: ->out[5]<br>PE6: ->out[6]<br>PE7: ->out[7] |
| 13 | RETURN; | 0x1020 | 0x1030 | 1 | - | |

FIG. 5

PARALLEIZING LOOPS IN THE PRESENCE OF POSSIBLE MEMORY ALIASES

CROSS-REFERENCE TO RELATED APPLICATIONS

This application claims priority to U.S. Application 61/788,471, entitled "A METHOD TO PARALLELIZE LOOPS IN THE PRESENCE OF POSSIBLE MEMORY ALIASES," filed Mar. 15, 2013, which is hereby incorporated by reference in its entirety.

TECHNICAL FIELD

The present disclosure relates generally to parallel processing and, more particularly, to parallelizing loops.

BACKGROUND

Modern hardware technology provides the ability to increase processing speeds by using multiple processing elements (PEs), which each may perform a separate, parallel operation; such processing is sometimes referred to as parallel processing, or parallelization. In order to take advantage of a potential speed-up in processing from parallelization, a compiler may determine whether source code may be parallelized. For example, a compiler may parallelize a loop—referred to as vectorization—if each iteration of the loop does not depend on any previous iteration of the loop. Such dependencies are often in the form of memory aliases—i.e., where multiple pointers reference a single memory address. A compiler may attempt to prove at compile-time that such potential memory aliases do not exist, so that the compiler can generate parallel code.

BRIEF DESCRIPTION OF THE DRAWINGS

The present disclosure is best understood from the following detailed description and the accompanying Figures. It is emphasized that, in accordance with standard practice in the industry, various features are not drawn to scale and are used for illustration purposes only. In fact, the dimensions of the various features may be arbitrarily increased or reduced for clarity of discussion.

FIG. 3 illustrates an exemplary result of running code, compiled according an implementation of the present specification, on hardware with two processing elements in parallel.

FIG. 4 illustrates an exemplary result of running code, compiled according an implementation of the present specification, on hardware with four processing elements in parallel.

FIG. 5 illustrates an exemplary result of running code, compiled according an implementation of the present specification, on hardware with eight processing elements in parallel.

DETAILED DESCRIPTION

Overview

Figure 1:
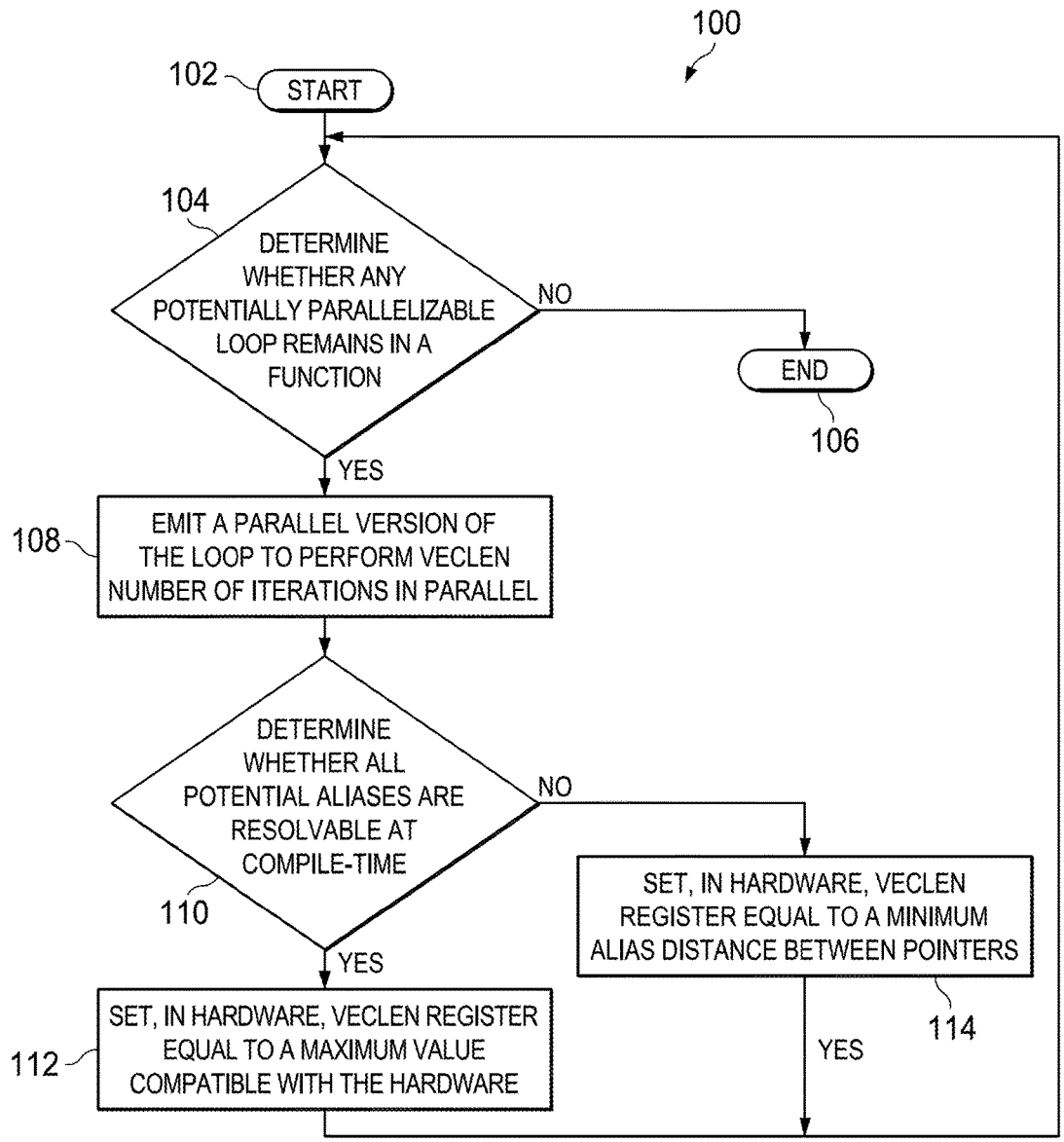
FIG. 1 is a flow chart of exemplary logic for parallelizing a loop in the presence of possible memory aliases according to one or more embodiments of the present specification.

According to one aspect of the present specification, there is disclosed a method to determine a degree of parallelization possible for a loop in a presence of possible memory aliases, comprising providing hardware instructions that test memory addresses at run-time; and setting a mode or register that enables a single instance of a loop to run a maximum number of Single Instruction, Multiple Data (SIMD) lanes to run in parallel that obey semantics of an original scalar loop.

According to another aspect of the present specification, there is disclosed An apparatus for determining a degree of parallelization possible for a loop in a presence of possible memory aliases, comprising at least one processing element for executing hardware instructions that test memory addresses at run-time; and a mode or register that is set to enable a single instance of a loop to run a maximum number of Single Instruction, Multiple Data (SIMD) lanes to run in parallel that obey semantics of an original scalar loop.

According to yet another aspect of the present specification, there is disclosed At least one machine readable non-transitory storage medium having instructions stored thereon for determining a degree of parallelization possible for a loop in a presence of possible memory aliases, wherein the instructions when executed by at least one processors cause the at least one processors to perform the following operations execute hardware instructions that test memory addresses at run-time; and set a mode or register that enables a single instance of a loop to run a maximum number of Single Instruction, Multiple Data (SIMD) lanes to run in parallel that obey semantics of an original scalar loop.

Detailed Description of Example Embodiments

High-level languages such as C/C++ express program semantics that operate on scalar types. For example, a function to add two vectors together may be implemented as follows:

```
void add(int *a, int *b, int *c) {
    for (int i=0; i != N; i++)
        a[i] = b[i] + c[i];
}
```

In theory, the individual additions of the elements of the vectors can be performed in parallel. However, to do this, a compiler may determine that there are no memory aliases between the input and output vectors, i.e., the memory addresses of the input vectors and the output vectors do not overlap each other. In the case above, the pointers 'a' and 'b', for example, may point to related areas of memory. This would happen, for example, if one of the calls to the above function were:

add(&a[1], &a[0], &b[0]);

In this case, there is a loop-carried dependence in the addition loop (i.e., one iteration of the loop depends on a result computed in a previous iteration of the loop), and the summation of the elements cannot be done in parallel.

A compiler may attempt to prove, at compile-time, that such potential aliases do not exist, so that parallel code can be created. However, some potential aliases may remain unresolvable at compile-time. The following approaches relate to addressing aliases, unresolvable at compile-time, that prevent vectorization:

1) A compiler may provide information to a programmer that an unresolvable alias prevented vectorization, in the form of a compiler remark or assembly annotation. The programmer may then change their code source by using a 'restrict' qualifier, pragmas, or other techniques to help the compiler to resolve the alias. However, in many cases the programmer is unaware of how the code works (especially if maintaining third-party code). Moreover, this approach may not lend itself to cases where an alias only sometimes does exist but is not always present.

2) A compiler may emit a run-time test of aliases, and emit two different versions of a loop: a vectorized and a scalar version. The appropriate version of the loop executes depending on whether an alias existed or not. A challenge for this approach is codesize expansion and lack of scalability to wide vector lengths (e.g., many different loops with different vectorization factors to create efficient code for all possible alias distances on a wide vector machine).

3) Conditionally turning on SIMD mode without hardware support (e.g., on SHARC 2116x) may have the following challenges: (i) it may only cope with one vector lane enabled (scalar mode) or two vector lanes enabled (vector mode); (ii) it may not provide special instructions to detect aliases in an efficient manner; and (iii) it may not implement features that allow special operation, dependent on a number of vector lanes enabled. Thus, such an approach may have high set-up and tear down cost and many not be able to vectorize all potentially vectorizable loops.

Accordingly, there are cases where the compiler cannot prove that no aliases exist between the input and output arrays. Therefore, the compiler may be conservative and emit only scalar code (e.g., serial code). In some cases an alias exists, but it may not occur each time the function is invoked. Therefore, a function could sometimes execute in parallel but during other invocations must execute serially. A challenge is therefore is to find a way to obtain the speed-up from parallelization where possible while also producing correct code in the cases where an alias does exist.

A solution is to add hardware support to a SIMD processor (a processor that supports Single Instruction, Multiple Data instructions via multiple PEs or SIMD within-a-register (SWAR)) to allow a single loop to run in either scalar mode or with multiple SIMD lanes (or vector lanes) enabled. An amount of parallelization that is enabled is determined by a run-time test for pointer aliasing. Advantageously, this enables the single loop to execute correctly regardless of where the input and output arrays happen to be in memory (e.g., regardless of whether the aliases exist). Moreover, the maximum number of vector lanes is enabled to obtain the maximum speed-up subject to obeying the loop-carried dependencies of the original scalar loop.

An implementation according to the present specification may be evident in the instruction set architecture (ISA) of a chip, and its visible register set. The specifics of the instructions may be implemented in many ways (e.g., splitting an alias test into multiple instructions, combining multiple alias tests, or using VECLENs that are limited to powers of two). As discussed through the present specification, instructions may be utilized to test for aliases and to determine a vector length register or PE mask register accordingly. Moreover, instructions implemented according to the present specification may permit variable vector length in a loop.

In an implementation, hardware may allow a loop to run in either scalar mode or with multiple SIMD lanes. For example, consider the function add( ) defined above. If there are two call sites:
add(&a[1], &a[0], &b[0]);
and
add(&a[4], &a[0], &b[0]);

When executing the first call (i.e., add(&a[1], &a[0], &b[0])), a processor may determine that &a[1] and &a[0] are only one iteration apart in memory (e.g., based on the size of the object or primitive in the array) and thus only one vector lane may be enabled to reproduce the original scalar semantics of the loop. Therefore, the loop may execute in scalar mode. However, during the second call (i.e., add(&a[4], &a[0], &b[0])), the processor may determine that four iterations of the loop can be executed in parallel with the same semantics as the scalar loop. Therefore, four vector lanes may be enabled and the loop thereby may provide an increase in speed of a factor of four. Thus, the hardware enables a test of memory addresses at run-time and enables a single instance of a loop to run a maximum number of SIMD lanes to run in parallel that obey semantics of an original scalar loop.

As further described below, the present disclosure provides for example embodiments, including by way of non-limiting example one or more of following features:

Feature 1: The hardware has a mechanism to specify how many vector lanes are enabled (VECLEN). For example, the mechanism may be a mode register that contains the number of lanes that are enabled, or it may be a mask register that controls which lanes are enabled.

Feature 2: The hardware has a means to set the mode register to enable a maximum number of vector lanes based on a test of memory addresses at run-time.

In addition, one or more of the following features may improve the efficiency or applicability of a scalar/vector loop:

Feature 3: The hardware has a means of altering the number of iterations of the loop dependent on the number of lanes that are enabled (e.g., the number of lanes enabled based on Feature 2). For example, if the processor has hardware support for counted loops which uses a dedicated loop count register, this loop count register may be initialized by dividing the number of scalar iterations by the number of vector lanes that are enabled in parallel.

Feature 4: The SIMD Staged loop allows the ability to allow the loop to run over vector lengths that are not multiples of a vectorization factor (e.g., a number of vector lanes enabled at run-time).

Feature 5: Increments of induction variables, in particular those that represent memory addresses used in the loop, are scaled by the number of vector lanes that are enabled in the loop.

Feature 6: A means to perform reductions (summation, bitwise operations, minimum or maximum) across the vector lanes currently enabled according to the mode register.

Feature 7: A means to copy a value from the last vector lane used in the last iteration of a loop to memory or to a known register location.

Turning now to the attached figures, FIG. 1 is a flow chart of exemplary logic for parallelizing a loop in the presence of possible memory aliases according to one or more embodiments of the present specification. In this example, logic 100 comprises start point 102, determining whether any potentially parallelizable loop remains in a function 104, emitting a parallel version of the loop to perform VECLEN number of iterations in parallel 108, determining whether all potential aliases are resolvable at compile-time 110; set, in hardware, VECLEN register equal to a maximum value compatible with the hardware 112; setting, in hardware, VECLEN register equal to a minimum alias distance between pointers 114, and end point 106. Logic 100 may be implemented, in whole or in part, in any of a compiler, a run-time engine, a run-time environment, a processor. Moreover, procedures 102-114, or portions thereof, may be distributed among one or more components.

Logic 100 begins at start point 102. Start point 102 may coincide with a start/end point of other logic, routines, applications, or threads. In addition, at start point 102, data (e.g., objects, values, variables, etc.) may be initialized, retrieved, or accessed for use in logic 100.

Next, at procedure 104, it is determined whether any potentially parallelizable loop remains in a function 104. Potentially parallelizable loops are, e.g., loops that are parallelizable if no aliases exist between pointers input to the loop. Based on the determination, the logic may emit code for a parallelized loop. However, if no such potentially parallelizable loop remains in the function, then logic 100 proceeds to end point 106.

If it is determined that a potentially parallelizable loop remains in the function, then the logic 100 emits a parallel version of the loop to perform VECLEN number of iterations, according to procedure 108. As described above with respect to Feature 1, hardware may specify a number of vector lanes that are enabled using a mode register (e.g., VECLEN register). The code emitted at procedure 108 may utilize the value of the VECLEN register to determine a number of iterations of the loop to parallelize at run-time. Advantageously, logic 100 may emit a single version of the code that allows a number of parallel iterations of the loop to be determined at run-time based on the hardware register. This single version of the code allows the flexibility to execute the code serially (e.g., VECLEN=1) or in parallel (e.g., VECLEN>1) based on a test of two or more addresses at run-time.

At compile-time, it is determined whether all potential aliases are resolvable, according to procedure 110. As discussed above, there may not be sufficient information to prove whether aliases exist at compile-time. However, if logic 100 can prove at compile-time that no aliases exit, then it may emit code to parallelize the code (e.g., at procedure 108). For example, if a loop only accesses two global arrays that are provably independent in memory, then the logic may determine that all potential aliases in such a loop are resolvable at compile time.

If it is determined that all potential aliases are resolvable, then a VECLEN register is set equal to a maximum value that is compatible with hardware, according to procedure 112. For example, if the compiled code will execute on hardware having four processing elements, each with four vector lanes, then the maximum value of VECLEN that is compatible with such hardware is 4×4 (i.e., 4 PEs each having 4 vector lanes) or 16. In such a case, the logic may set the VECLEN register to 16 for parallelizing the loop, and thus 16 iterations of the loop performed in parallel. The VECLEN register may be a mode register that contains the number of lanes that are enabled, or it may be a mask register that controls which lanes are enabled.

If is determined that all potential aliases are not resolvable, then the VECLEN register is set equal to a minimum alias distance between pointers, according to procedure 114. The value of a pointer may be compared to other pointers accessed within a loop. For example, pairwise comparisons may be made between each pointer and all other pointers, in turn, to determine a set of potential values of VECLEN. The VECLEN register that is set at procedure 114 is one implementation of the hardware mechanism according to Feature 1. The values of the VECLEN register may be set to specify a number of vector lanes enabled based on a test of memory addresses at runtime, according to Feature 2.

After the VECLEN register is set at either of procedures 112 or 114, logic 100 returns to procedure 104 to determine whether any potentially parallelizable loop remains in a function remains in the function. If not, logic 100 may end at end point 106. End point 106 may serve as a start/end point for other logic, routines, applications, or threads. For example, end point 106 may direct a processor to, upon receiving a subsequent query, execute logic beginning with start point 102.

Turning now to other implementations of the present specification, Features 1, 2, 3, 4 and 5 may be illustrated using the aforementioned example of vector addition (i.e., the add( ) function above). The following pseudocode corresponds to standard scalar loop code generated for such a function:

```
Loop N; // start loop of N iterations
    r0 = [i0 += 4]; // load b[i], and increment address register to next
        element in array
    r1 = [i1 += 4]; // load c[i], and increment address register to next
        element in array
    r0 = r0 + r1; // add vector elements
    [i2 += 4] = r0;// store a[i], and increment address register to next
        element in array
endloop
```

Note that each of r0 and r1 corresponds to a data register, and each of i0, i1, and i2 corresponds to an addressing register, which contains a memory address.

In an implementation, hardware is augmented with a mode register (e.g., VECLEN register), which contains a number of vector lanes enabled, e.g., according to Feature 1. As an example, the mode register may be the VECLEN register referred to in logic 100 (e.g., at procedures 108, 112, and 114). For scalar code, the mode register is set to 1—a single vector lane is enabled. It is in this state before the loop is reached. For simplicity, an assumption may be made that an architecture for the hardware comprises a number of identical PEs, so that the register file is duplicated for each PE. Therefore, a register 'r2', for example, can be thought of as a set of registers, one on each PE, in the same place in each PE's register file.

Figure 2:
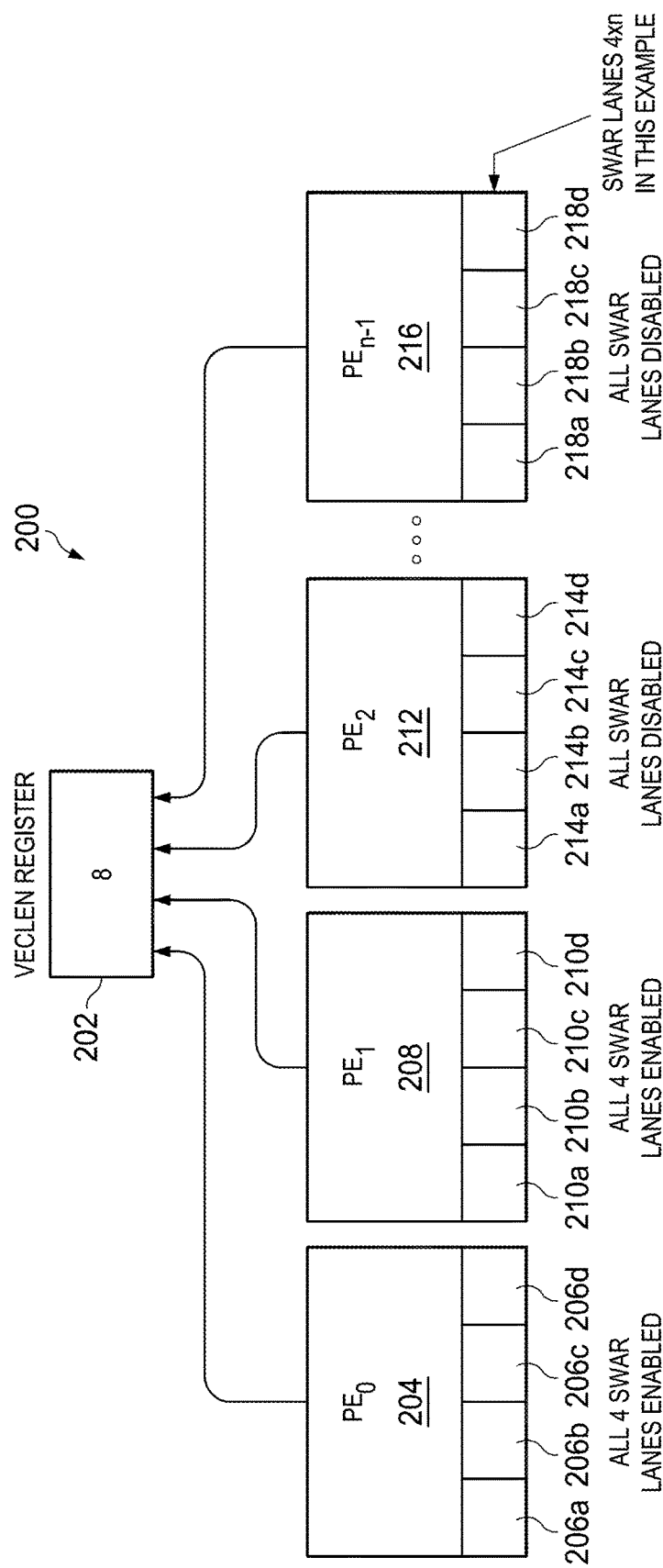
FIG. 2 is a block diagram of an exemplary hardware implementation comprising a register that contains a number of lanes that are enabled, according to one or more embodiments of the present specification.

For example, FIG. 2 is a block diagram of an exemplary hardware implementation comprising a mode register that contains a number of lanes that are enabled, according to one or more embodiments of the present specification. In this example, hardware 200 comprises VECLEN register 202, processing element zero (PE0) 204 with corresponding SWAR lanes 206, processing element one (PE1) 208 with corresponding SWAR lanes 210, processing element two (PE2) 212 with corresponding SWAR lanes 214, and processing element n-1 (PEn-1) 216 with corresponding SWAR lanes 218. Each processing element in hardware 200 has 4 SWAR lanes. Thus, the total number of SWAR lanes in system 200 is equal to 4 times n. VECLEN register 202 controls enabling of processing elements (e.g., 204, 208, 212, and 216) and SWAR lanes (e.g. 206, 210, 214, and 218). In this example, VECLEN register 202 is set to 8; thus only 8 SWAR lanes are enabled, out of the total 4×n SWAR lanes. Accordingly, each of SWAR lanes 206a, 206b, 206c, 206d, 210a, 210b, 210c, and 210d are enabled while SWAR lanes 214a, 214b, 214c, 214d, 218a, 218b, 218c, and 218d are disabled. The value stored in VECLEN register 202 may be set to enable a maximum number of SIMD lanes (and/or vector lanes) that obey semantics of an original scalar loop, based on a test of memory addresses at run-time.

In FIG. 4, VECLEN register 202 is shown in a state where it is set to equal to 8. However, the VECLEN register 202 may be updated to specify a different number (e.g., based on a test of pointers at run-time). VECLEN register 202 may be set to any value where 0<VECLEN≤(n*number of vector lanes in each PE); in this example VECLEN may be value such that 0<VECLEN≤(n*4). In an implementation, the value of VECLEN may be limited to values that are powers of 2 (i.e., 1, 2, 4, 8, etc.).

Hardware 200 may support either a scalar mode (e.g., a serial mode; non-parallel mode; Single Instruction, Single Data (SISD) mode; etc.) or a parallel mode (e.g., multiple vector lane mode, SIMD mode, etc.), thus VECLEN register 202 may comprise an indicator of a mode. The mode may be set (and/or updated) at run-time and thus may support conditionally entering either a scalar mode or a parallel mode based on a test of memory addresses at run-time.

Hardware 200 may use data alignment information to determine whether there are any loop-carried dependencies, or aliases. For global arrays, a compiler may know whether aliases exist, e.g., based on the memory locations of the arrays. In addition, for function parameters, the compiler may perform interprocedural analysis (IPA) to attempt to prove that the pointers point to distinct objects (e.g., to prove that aliases do not exist). If the parameters are, e.g. pointers to different objects in a single array of objects, then the system may determine an amount of difference between the parameters (e.g., difference in memory address of the pointers). In some cases, known data alignment information may be sufficient to determine whether a loop-carried dependence exists. For example, two pointers to 32-bit integers that start aligned on double-word boundaries do not have a loop carried dependency on the previous iteration. In an implementation, a compiler may vectorize loops based on the data alignment information. In such a case, a compiler may use IPA to propagate information about data alignment between components (e.g., from caller to callee).

An exemplary architecture may comprise a means to test address registers for aliases, e.g., according to Feature 2. For example, an alias( ) function may set a value of VECLEN (e.g., VECLEN register 202) based on a test of memory addresses in the address registers. There are many ways to define such instructions. Instructions for alias( ) may be implemented as follows:

```
void alias (int *ptr1, int *ptr2, int sizeOf) {
VECLEN =
(ptr1> ptr2 && (ptr1− ptr2)/sizeOf < VECLEN) ? (ptr1− ptr2)/sizeOf :
VECLEN
}
```

The above implementation determines whether the first pointer ptr1 is greater than the second pointer ptr2 by comparing the values of the pointers, i.e., ptr1>ptr2. For example, in a language like C or C++, the value of each pointer is a memory address; thus comparing the values of the pointers, in effect, compares memory addresses. Further, the implementation determines whether the difference between the addresses, measured in multiples of the access size, is less than the number of vector lanes enabled, i.e., (ptr1−ptr2)/sizeOf<VECLEN. The distance may be expressed, e.g., in bits, bytes, or as multiples of a data type. For example, if two pointers to arrays of integers (int values) are 8 bytes apart (ptr1−ptr2=8 bytes), the system divides the difference by the size of an int in memory, e.g., 4 bytes, to determine a value of 8/4=2. This value may represent a number of lanes that may run in parallel while obeying semantics of the original scalar loop. If this function were running on hardware with 4 vector lanes enabled (i.e., if VECLEN=4), then the result is less than the number of vector lanes enabled (i.e., 2<4 is TRUE). If the first address ptr1 is greater than the second address ptr2 and (i.e., &&) the number of lanes that may run in parallel is less than the number of vector lanes enabled, then VECLEN is set to the determined number of lanes that may run in parallel; if both are not true, then VECLEN is set to the current value of VECLEN (e.g., the value of VECLEN remains unchanged). Therefore, the value of VECLEN is set to a maximize number of lanes that may run in parallel. Thus, the above implementation of alias( ) demonstrates exemplary instructions to test memory addresses at run-time and set a mode or register (e.g., VECLEN register 202) to enable a single instance of a loop to run a maximum number of SIMD lanes to run in parallel that obey semantics of an original scalar loop. Likewise, the test may be used to set a mask register that controls which lanes are enabled.

Testing address registers for aliases may be implemented as follows:

```
VECLEN = __MAX_VECTOR_LANES_ON_PROCESSOR__; // e.g.,
if machine is capable of 16 vector lane processing
in parallel, this sets VECLEN to 16.
alias(i2, i0, 4); // sets VECLEN to (i2 > i0 && (i2−i0)/4 < VECLEN) ?
(i2−i0)/4 :VECLEN.
alias(i1, i0, 4); // sets VECLEN to (i1 > i0 && (i1−i0)/4 < VECLEN) ?
(i1−i0)/4 :VECLEN
```

Note that in the above examples where i0=&a[0], i1=&b[0] and i2=&a[1], this sequence sets VECLEN to 1, whereas for the case where i0=&a[0], i1=&b[0] and i2=&a[4], this sequence sets VECLEN to 4.

The alias( ) function above sets the value of VECLEN based on a test of memory addresses. There are many ways to define such instructions. An aspect of the present disclosure relates to instructions to test the values of two memory addresses at run-time to permit setting a vector lane enable mode register based on the difference between the addresses. Alternatively, an implementation of instructions to test memory addresses registers for aliases may set a mode register (e.g., to SISD mode or SIMD mode). The instructions may determine whether a difference between two or more addresses allows vectorization. Based on the determination, the instructions may set a mode (e.g., as opposed to or in addition to setting the number of vector lanes). If, for example, the difference only permits a single loop to be processed at a time then the instructions may set the mode equal to SISD mode. However, if the difference permits more than one to process the time instructions may set the mode equal to SIMD mode. Such a determination may be made at run-time to set the appropriate mode in a mode register.

In an implementation, e.g., according to Feature 3, the number of iterations of the loop may be altered based on the number of lanes that are enabled. For example, the following pseudocode corresponds to an exemplary loop set-up according to feature 3:

```
vloop N; // start loop of N/VECLEN iterations
r0 = [i0 += 4]; // load b[i], and increment address register to next set of
elements in array
r1 = [i1 += 4]; // load c[i], and increment address register to next set of
elements in array
r0 = r0 + r1; // add elements pairwise
```

```
[i2 += 4] = r0;// store a[i], and increment address register to next set of
elements in array
endloop
```

In this case, the trip count N is divided by the number of vector lanes enabled (VECLEN) to determine the number of iterations of the loop. This may be combined with SIMD Staged Loop (e.g., according to Feature 4) to allow for values of N that are not multiples of VECLEN. This latter feature may turn off some of the vector lanes in a last iteration of the loop to cope with the final odd elements.

Note that the instructions in the loop that increment the address registers increment not by 4, but by VECLEN*4 (e.g., according to Feature 5). This means that once the first iteration has computed VECLEN elements of the addition, the address registers are updated to point to the next set of elements of the vector. Address increment values may be automatically scaled by the current value of VECLEN to enable this functionality.

To illustrate Features 6 and 7, another example is used. The following pseudocode corresponds to a scalar-product computation, which has been added to a vector addition loop:

```
int add_and_dp(int *a, int *b, int *c) {
    int sum = 0;
    for (int i=0; i != N; i++) {
        sum += b[i] * c[i];
        a[i] = b[i] + c[i];
    }
    return sum;
}
```

The following pseudocode corresponds to code for vectorizing the above add_and_dp( ) function, according to an implementation of the present specification:

```
VECLEN = __MAX_VECTOR_LANES_ON_PROCESSOR__;
alias(i2, i0, 4);
alias(i1, i0, 4);
r2 = 0;
vloop N;
r0 = [i0 += 4]; // load b[i], and increment address register to next set of
elements in array
r1 = [i1 += 4]; // load c[i], and increment address register to next set of
elements in array
r2 += r0 * r1; // multiply elements pairwise and add to running vector
sum
r0 = r0 + r1; // add elements pairwise
[i2 += 4] = r0;// store a[i], and increment address register to next set of
elements in array
endloop
r0 = side_sum(r2);
```

The above code demonstrates use of an exemplary side_sum( ) function, which is able to perform sideways reductions in scalar code (i.e., VECLEN=1) and parallel code (i.e., VECLEC>1). The side_sum instruction, e.g., implemented according to feature 6, adds VECLEN number of elements of the vector running sum in r2 and gives the result in PE0's r0.

Although this instruction may be avoided based on a specific initialization of all PEs' r2 registers and subsequent side_sum across all possible vector lanes, an advantage of a separate instruction is the possibility to optimize the latency of the instruction depending on the run-time value of VECLEN. To demonstrate this latter point r0=side_sum(r2) is a simple copy when VECLEN=1, but is the addition of 16 values when VECLEN=16; the latter could take longer than the former.

Feature 7 can be demonstrated with the following pseudo-code, which may use a loop mechanism that copes with arbitrary vector lengths (e.g., a loop mechanism implemented according to Feature 4):

```
int add_and_last(int *a, int *b, int *c) {
    int tmp;
    for (int i=0; i != N; i++) {
        tmp = b[i] + c[i];
        a[i] = tmp;
    }
    return tmp;
}
```

Note that the value returned by the function is the last value of tmp computed during the loop. The vector lane where this result is computed depends on how VECLEN is set and the value of N. Hence, it is not known at compile time. There are at least two ways to cope with this situation. Firstly, a new instruction that stores to memory or copies to a known register is defined that only occurs on the highest-numbered enabled vector lane. For example:

[i5]=last r0; // e.g., if PE0, PE1, and PE2 are enabled, and PE3, PE4, PE5, PE6, and PE7 are disabled, this stores PE2's r0 to the memory location in i5.

r3=last r0; // e.g., if PE0, PE1, and PE2 are enabled, and PE3, PE4, PE5, PE6, and PE7 are disabled, this stores PE2's r0 to the PE0's r3.

Alternatively, an instruction such as:

r3=last r0, N;

uses the original trip count N and VECLEN to determine in which vector lane the last value resides, and copies it to PE0's r3. For example:

r3=last r0, 13;

where VECLEN=8, would copy PE4's r0 to PE0's r3.

A compiler implemented according to the present specification may emit code to parallelize a function, where a degree of parallelization is determined at run-time based on a hardware register. For example, a function to copy the values in one vector to another vector may be implemented as follows:

```
void cpy(int *out, int *in) {
    for (int i=0; i < 8; i++)
        out[i] = in[i];
}
```

The compiler may compile and emit (e.g., at procedure 108 of logic 100) the following version of the code:

```
_cpy:
P1 = parameter 1;
P1 = parameter 2;
VECLEN = 8;
VECLEN = alias(P0, P1, 4); //sizeof(int) is equal to 4 bytes
LOOP (8/VECLEN)
    R0 = *P1++; //load in[i]
    *P0++ = R0; //store to out[i]
ENDLOOP
RETURN;
//Pn are address registers and Rn are data registers.
```

The compiled code initializes the value of VECLEN to 8. However, the value of VECLEN is updated at run-time based on the output of the alias( ) function (e.g., according to Features 1 and 2). The instructions for alias( ) as referenced in the compiled code, may be implemented according to any of the exemplary instructions provided in the present specification. The loop (e.g., LOOP) is executed on VECLEN number of processing elements in parallel and the loop is repeated 8/VECLEN number of times. Because the value of VECLEN is set at run-time, the number of iterations of the loop is also determined at run-time (e.g., according to feature 3). Thus, the compiled code may execute a number of iterations of the loop in parallel based on a value of VECLEN determined at run-time.

FIG. 3 illustrates an exemplary result of running code, compiled according to an implementation of the present specification, on hardware with two processing elements in parallel. In particular, FIG. 3 illustrates an exemplary result of running the above code compiled code (i.e., _cpy) with input pointers P0=0x1008 and P1=0x1000 and on hardware with eight processing elements that may execute in parallel (e.g. maximum number of vector lanes is 8). The figure shows a cycle number and corresponding columns for the instruction that are executed at the cycle (i.e., INSTRUCTION), the value of address registers P0 and P1, the value of VECLEN, the value of the loop counter (i.e., LC), and the value of data register R0. At cycles 0-2, the address registers and VECLEN are initialized. In this example, VECLEN is initialized equal to 8; however, at cycle 3, VECLEN is updated from 8 to 2 based on comparing the memory addresses of P0 and P1 and the maximum number of processing elements available on the hardware. The first iteration of the loop, at cycles 5 and 6, loads the first two values from the 'in' array and stores them to the corresponding locations on the 'out' array. Similarly, the loop is repeated a total of four times, since 8/VECLEN=8/2=4. The remaining three loops are completed in cycles 7-8, 9-10, and 11-12, respectively. Finally the function returns at cycle 13. After each loop, induction variables are incremented by values that are scaled by the number of processing elements (or vector lanes) enabled in the loop (e.g., according to feature 5). For example, between cycles 5 and 7, the values in P0 and P1 are incremented by twice the access size based on 2 processing elements being enabled (so that, for example, in the first iteration of the loop, P1 contains the address of data element in[0] while in the second iteration it contains the address of data element in[2]).

FIG. 4 illustrates an exemplary result of running the same code, as was used for FIG. 3, compiled according an implementation of the present specification, where at run-time the input pointers are found to have values P0=0x1010 and P1=0x1000. Again the hardware has eight processing elements that may execute in parallel. In FIG. 4, the value of VECLEN is set to 4 at cycle 4, while in FIG. 3 the value of VECLEN is set to 2 at cycle 4. The difference is due to the difference in addressing register values determined at run-time. Again, in each iteration, the induction variable increments are scaled by the number of processing elements (or vector lanes) enabled in the loop (e.g., according to feature 5). In the example in FIG. 4, between cycles 5 and 7, the P0 and P1 values are incremented by 4 times the access size, based on the 4 processing elements enabled (in this case, in the first iteration of the loop, P1 contains the address of data element in[0] while in the second iteration it contains the address of data element in[4]).

FIG. 5 illustrates an exemplary result of running the same compiled code, as used for FIGS. 3 and 4, compiled according an implementation of the present specification. Again the hardware has eight processing elements, which may execute in parallel. In this exemplary output, the compiler may determine that there are no aliases since the output pointer has a value (0x1000) that is less than that of the input pointer (0x1010). Accordingly, at cycle 3 the value of VECLEN is set to the maximum number of processing elements, which in this case is 8. Because the cpy( ) function only performs 8 iterations in the original scalar loop, all are achieved in a single iteration of the compiled, parallel code.

As can be seen from the exemplary results illustrated in FIGS. 3, 4 and 5, a single version of compiled code can correctly execute in the presence of potential aliases based, at least in part, on a hardware register that is set a run-time. Instructions to test memory addresses at run-time for aliases (e.g., instructions for alias( ) may set the register to specify and/or activate vector lanes so as to exploit SIMD processing using a single compiled version of a loop.

In the discussions of the embodiments above, the registers, switches, amplifiers, and/or transistors can readily be replaced, substituted, or otherwise modified in order to accommodate particular circuitry needs. Moreover, it should be noted that the use of complementary electronic devices, hardware, software, etc. offers an equally viable option for implementing the teachings of the present disclosure.

In one example embodiment, any number of electrical circuits of the FIGURES may be implemented on a motherboard of an associated electronic device. The motherboard can be a general circuit board that can hold various components of the internal electronic system of the electronic device and, further, provide connectors for other peripherals. More specifically, the motherboard can provide the electrical connections by which the other components of the system can communicate electrically. Any suitable processors (inclusive of digital signal processors, microprocessors, supporting chipsets, etc.), memory elements, etc. can be suitably coupled to the motherboard based on particular configuration needs, processing demands, computer designs, etc. Other components such as external storage, additional sensors, controllers for audio/video display, and peripheral devices may be attached to the motherboard as plug-in cards, via cables, or integrated into the motherboard itself.

In another example embodiment, the electrical circuits of the FIGURES may be implemented as stand-alone modules (e.g., a device with associated components and circuitry configured to perform a specific application or function) or implemented as plug-in modules into application specific hardware of electronic devices. Note that particular embodiments of the present disclosure may be readily included in a system on chip (SOC) package, either in part, or in whole. An SOC represents an IC that integrates components of a computer or other electronic system into a single chip. It may contain digital, analog, mixed-signal, and often radio frequency functions: all of which may be provided on a single chip substrate. Other embodiments may include a multi-chip-module (MCM), with a plurality of separate ICs located within a single electronic package and configured to interact closely with each other through the electronic package. In various other embodiments, the amplification functionalities may be implemented in one or more silicon cores in Application Specific Integrated Circuits (ASICs), Field Programmable Gate Arrays (FPGAs), and other semiconductor chips.

Note that the activities discussed above with reference to the FIGURES are applicable to any integrated circuits that involve signal processing, particularly those that can execute specialized software programs, or algorithms, some of which may be associated with processing digitized real-time data. Certain embodiments can relate to multi-DSP signal processing, floating point processing, signal/control processing, fixed-function processing, microcontroller applications, etc.

In certain contexts, the features discussed herein can be applicable to medical systems, scientific instrumentation, wireless and wired communications, radar, industrial process control, audio and video equipment, current sensing, instrumentation (which can be highly precise), and other digital-processing-based systems.

Moreover, certain embodiments discussed above can be provisioned in digital signal processing technologies for medical imaging, patient monitoring, medical instrumentation, and home healthcare. This could include pulmonary monitors, accelerometers, heart rate monitors, pacemakers, etc. Other applications can involve automotive technologies for safety systems (e.g., stability control systems, driver assistance systems, braking systems, infotainment and interior applications of any kind). Furthermore, powertrain systems (for example, in hybrid and electric vehicles) can use high-precision data conversion products in battery monitoring, control systems, reporting controls, maintenance activities, etc.

Furthermore, some embodiments can be applied in digital signal processing technologies that have limited memory resources. For example, mobile phones, mobile health tracking devices, digital cameras, etc. may contain limited memory resources due, in part, to the compact size of such devices. In addition, these devices may perform complex signal processing on an embedded processor(s). Advantageously, embodiments of the present specification can produce compact code, thereby consuming less memory to execute. Exemplary applications could include cropping an image on a mobile phone, analyzing heart rate data on a mobile health tracking device, applying a filter to an image on a digital camera, etc. A further advantage is that an embodiment of the present specification can maximize the amount of parallelization at run-time, thereby reducing the time required to execute such applications.

In yet other example scenarios, the teachings of the present disclosure can be applicable in the industrial markets that include process control systems that help drive productivity, energy efficiency, and reliability. In consumer applications, the teachings of the signal processing circuits discussed above can be used for image processing, auto focus, and image stabilization (e.g., for digital still cameras, camcorders, etc.). Other consumer applications can include audio and video processors for home theater systems, DVD recorders, and high-definition televisions. Yet other consumer applications can involve advanced touch screen controllers (e.g., for any type of portable media device). Hence, such technologies could readily part of smartphones, tablets, security systems, PCs, gaming technologies, virtual reality, simulation training, etc.

It is also imperative to note that all of the specifications, dimensions, and relationships outlined herein (e.g., the number of processors and memory elements, logic operations, etc.) have only been offered for purposes of example and teaching only. Such information may be varied considerably without departing from the spirit of the present disclosure, or the scope of the appended claims. The specifications apply only to one non-limiting example and, accordingly, they should be construed as such. In the foregoing description, example embodiments have been described with reference to particular processor and/or component arrangements. Various modifications and changes may be made to such embodiments without departing from the scope of the appended claims. The description and drawings are, accordingly, to be regarded in an illustrative rather than in a restrictive sense.

Note that with the numerous examples provided herein, interaction may be described in terms of two, three, four, or more electrical components. However, this has been done for purposes of clarity and example only. It should be appreciated that the system can be consolidated in any suitable manner. Along similar design alternatives, any of the illustrated components, modules, and elements of the FIGURES may be combined in various possible configurations, all of which are clearly within the broad scope of this Specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

Other Notes, Examples, and Implementations

Note that all optional features of the apparatus described above may also be implemented with respect to the method or process described herein and specifics in the examples may be used anywhere in one or more embodiments.

In a first example, a system is provided (that can include any suitable circuitry, dividers, capacitors, resistors, inductors, ADCs, DFFs, logic gates, software, hardware, links, etc.) that can be part of any type of computer, which can further include a circuit board coupled to a plurality of electronic components. The system can include means for clocking data from the digital core onto a first data output of a macro using a first clock, the first clock being a macro clock; means for clocking the data from the first data output of the macro into the physical interface using a second clock, the second clock being a physical interface clock; means for clocking a first reset signal from the digital core onto a reset output of the macro using the macro clock, the first reset signal output used as a second reset signal; means for sampling the second reset signal using a third clock, which provides a clock rate greater than the rate of the second clock, to generate a sampled reset signal; and means for resetting the second clock to a predetermined state in the physical interface in response to a transition of the sampled reset signal.

The 'means for' in these instances (above) can include (but is not limited to) using any suitable component discussed herein, along with any suitable software, circuitry, hub, computer code, logic, algorithms, hardware, controller, interface, link, bus, communication pathway, etc. In a second example, the system includes memory that further comprises machine-readable instructions that when executed cause the system to perform any of the activities discussed above.

What is claimed is:

1. A method to determine a degree of parallelization possible for a loop in a presence of possible memory aliases, comprising:
   providing hardware instructions that test memory addresses for pointer aliasing at run-time, at least in part, by determining a distance between the memory addresses, wherein the distance is measured in multiples of a data type;
   providing a scalar code that, when executed, performs a function;
   generating, from the scalar code, a vectorized code containing a same number of loops as the scalar code; and
   setting a mode or register that specifies a maximum number of Single Instruction, Multiple Data (SIMD) lanes on which to execute the vectorized code in parallel to perform the function of the scalar code, wherein the maximum number of SIMD lanes is the lesser of the distance and a number of SIMD lanes that are enabled.

2. The method of claim 1, further comprising enabling the maximum number of SIMD lanes to obtain a maximum speed-up subject to obeying loop-carried dependencies of the scalar code.

3. The method of claim 1, further comprising, determining, by a processor, that the maximum number of SIMD lanes is to perform the function of the scalar code.

4. The method of claim 1, further comprising providing a hardware mechanism to specify the number of SIMD lanes that are enabled, wherein the hardware mechanism is one selected from the group consisting of: a mode register that contains the number of SIMD lanes that are enabled and a mask register that controls which SIMD lanes are enabled.

5. The method of claim 4, further comprising setting the hardware mechanism to enable the maximum number of SIMD lanes dependent on a test of memory addresses at run-time.

6. The method of claim 4, further comprising altering a number of iterations of the vectorized code dependent on the number of SIMD lanes that are enabled.

7. The method of claim 1, wherein a SIMD Staged loop allows the vectorized code to run over vector lengths that are not multiples of a vectorization factor.

8. The method of claim 1, wherein increments of induction variables are scaled by a number of vector lanes that are enabled in the vectorized code.

9. The method of claim 1, wherein the method includes performing reductions, which further include summation, bitwise operations, minimum or maximum, across vector lanes currently enabled according to a mode register.

10. The method of claim 1, wherein the method includes copying a value from a last vector lane used in a last iteration of the vectorized code to memory or to a known register location.

11. An apparatus for determining a degree of parallelization possible for a loop in a presence of possible memory aliases, the apparatus comprising:
    at least one processing element for executing hardware instructions that test memory addresses for pointer aliasing at run-time, at least in part, by determining a distance between the memory addresses, wherein the distance is measured in multiples of a data type;
    a scalar code that, when executed, performs a function;
    a vectorized code containing a same number of loops as the scalar code; and
    a mode or register that is set to specify a maximum number of Single Instruction, Multiple Data (SIMD) lanes on which to execute the vectorized code in parallel to perform the function of the scalar code, wherein the maximum number of SIMD lanes is the lesser of the distance and a number of SIMD lanes that are enabled.

12. The apparatus of claim 11, wherein the mode or register specifies how many SIMD lanes are enabled, and the mode or register is selected from the group consisting of a mode register that contains the number of SIMD lanes that are enabled and a mask register that controls which SIMD lanes are enabled.

13. The apparatus of claim 12, wherein the at least one processing element is operable to set the mode or register to enable the maximum number of SIMD lanes dependent on a test of memory addresses at run-time.

14. The apparatus of claim 12, wherein the at least one processing element is operable to alter a number of iterations of the vectorized code dependent on the number of SIMD lanes that are enabled.

15. The apparatus of claim 11, wherein the at least one processing element performs reductions, which further include summation, bitwise operations, minimum or maximum, across vector lanes currently enabled according to a mode register.

16. The apparatus of claim 11, wherein the at least one processing element copies a value from a last vector lane used in a last iteration of the vectorized code to memory or to a known register location.

17. At least one machine readable non-transitory storage medium having instructions stored thereon for determining a degree of parallelization possible for a loop in a presence of possible memory aliases, wherein the instructions, when executed by at least one processor, causes the at least one processor to perform the following operations:
    execute hardware instructions that test memory addresses for pointer aliasing at run-time, at least in part, by determining a distance between the memory addresses, wherein the distance is measured in multiples of a data type;
    access a scalar code that, when executed, performs a function;
    generate, from the scalar code, a vectorized code containing a same number of loops as the scalar code; and
    set a mode or register that specifies a maximum number of Single Instruction, Multiple Data (SIMD) lanes on which to execute the vectorized code in parallel to perform the function of the scalar code, wherein the maximum number of SIMD lanes is the lesser of the distance and a number of SIMD lanes that are enabled.

18. The method of claim 1, wherein the hardware instructions that test the memory addresses for pointer aliasing at run-time comprise instructors for:
   determining, at run-time, a difference between the memory addresses; and
   dividing the difference by a memory size of the data type to determine the distance, wherein each of the memory addresses holds a value of the data type.

19. The apparatus of claim 11, wherein the hardware instructions that test the memory addresses for pointer aliasing at run-time comprise instructors for:
   determining, at run-time, a difference between the memory addresses; and
   dividing the difference by a memory size of the data type to determine the distance, wherein each of the memory addresses holds a value of the data type.

20. The at least one machine readable non-transitory storage medium of claim 17, wherein the hardware instructions that test the memory addresses for pointer aliasing at run-time comprise instructors for:
   determining, at run-time, a difference between the memory addresses; and
   dividing the difference by a memory size of the data type to determine the distance, wherein each of the memory addresses holds a value of the data type.

* * * * *